(12) United States Patent
Lai

(10) Patent No.: US 6,549,895 B1
(45) Date of Patent: Apr. 15, 2003

(54) METHOD AND APPARATUS FOR ANALYZING DATA RETRIEVAL USING INDEX SCANNING

(75) Inventor: Tony Wen Hsun Lai, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 09/609,887

(22) Filed: Jul. 5, 2000

(30) Foreign Application Priority Data

Dec. 22, 1999 (CA) ............................................. 2293064

(51) Int. Cl.⁷ ............................................. G06F 17/30
(52) U.S. Cl. .................. 707/2; 707/3; 707/8; 707/5; 707/100
(58) Field of Search ................. 707/2, 5, 100, 707/8, 201, 7, 1, 10, 3; 711/160

(56) References Cited

U.S. PATENT DOCUMENTS

| | | | | |
|---|---|---|---|---|
| 4,422,145 A | * | 12/1983 | Sacco et al. ................. | 711/160 |
| 5,758,146 A | * | 5/1998 | Schiefer et al. ................. | 707/2 |
| 5,778,353 A | | 7/1998 | Schiefer et al. ................. | 707/2 |
| 5,913,207 A | | 6/1999 | Chaudhuri et al. ............. | 707/2 |
| 5,926,813 A | | 7/1999 | Chaudhuri et al. ............. | 707/5 |
| 5,950,186 A | | 9/1999 | Chaudhuri et al. ............. | 707/2 |
| 5,960,423 A | | 9/1999 | Chaudhuri et al. ............. | 707/2 |

\* cited by examiner

*Primary Examiner*—Kim Vu
*Assistant Examiner*—Gwen Liang
(74) *Attorney, Agent, or Firm*—Sawyer Law Group LLP

(57) ABSTRACT

A method and computer program product for analyzing data retrieval using index scanning in a database management system. The method involves scanning an index associated with a table in the database management system and selecting pages in the index. For each of the selected pages, the index entries are extracted and ranked. A distance parameter is then determined for each of the ranked index entries. The number of page transfers is estimated based on the distance parameters and the number of consecutive index entries which can be stored in the buffer pool.

22 Claims, 5 Drawing Sheets

| Rank | INDEX | | Distance |
|---|---|---|---|
| | Name | RID (page) | |
| 1 | 42a | 2 | |
| 2 | 42b | 1 | |
| 3 | 42c | 3 | |
| 4 | 42d | 3 | 1 |
| 5 | 42e | 1 | |
| 6 | 42f | 2 | 4 |
| 7 | 42g | 1 | 6 |
| 8 | 42h | 2 | 3 |

| Rank | INDEX | | Distance |
|---|---|---|---|
| | Name | RID (page) | |
| 1 | 42a | 2 | |
| 2 | 42b | 1 | |
| 3 | 42c | 3 | |
| 4 | 42d | 3 | 1 |
| 5 | 42e | 1 | |
| 6 | 42f | 2 | 4 |
| 7 | 42g | 1 | 6 |
| 8 | 42h | 2 | 3 |

50 — Rank
31' — INDEX
52 — Distance

METHOD AND APPARATUS FOR ANALYZING DATA RETRIEVAL USING INDEX SCANNING

FIELD OF THE INVENTION

The present invention relates to database management systems, and more particularly to a method and apparatus for analyzing data retrieval using index scanning.

BACKGROUND OF THE INVENTION

Database management systems are well-known in the art and comprise a computer system for recording and maintaining data. Typically, the database management system (DBMS) comprises the combination of an appropriate computer, direct access storage devices (DASD) or disk drives, and database management software. A relational database management system is a DBMS which uses relational techniques for storing and retrieving information. The relational database management system or RDBMS, such as the DB2 product from IBM, comprises computerized information storage and retrieval systems in which data is stored on disk drives or DASD for semi-permanent storage. The data is stored in the form of tables which comprise rows and columns. Each row or tuple has one or more columns.

The RDBMS is designed to accept commands to store, retrieve, and delete data. One widely used and well-known set of commands is based on the Structured Query Language or SQL. The term query refers to a set of commands in SQL for retrieving data from the RDBMS. The definitions of SQL provide that a RDBMS should respond to a particular query with a particular set of data given a specified database content. SQL however does not specify the actual method to find the requested information in the tables on the disk drives. The SQL requests are nonprocedural, also referred to as declarative, and users simply specify what is wanted, rather than specifying how to accomplish it. There are many ways in which a query can be processed and each consumes a different amount of processor and input/output access time. The system's optimizer must determine the optimal way (or access path) to get the data to the user. One way to access data is to sequentially scan every row in a table for those rows which match the search criteria. This type of scan is known as a table scan, because the entire table is scanned in sequence from beginning to end.

Rows of data are stored on pages on physical storage devices, usually disk drives or files. Data is transferred between the physical storage and the computer system's processing unit page by page even though only a single row may be needed from a given page. The time it takes to transfer data between physical storage and the processing unit is usually many times greater than the time it takes to process the data in the processing unit. To manipulate data in a relational database system, the rows must first be transferred from physical storage to the processing unit, then processed in the processing unit, and finally transferred back to physical storage. Because transferring takes so much longer than processing, the total time required to manipulate the data can be dramatically reduced if the number of transfers can be reduced.

Most relational database systems maintain indexes for their tables. An index is a list stored separately from the rows and used to access the rows in a selected order. An index comprises many index entries; each index entry includes a key value and an identifier of or pointer to a row which contains that key value. Indexes are physically stored on index pages. To scan a table's rows using an index, the index entries are read sequentially and pointers in the entries are used to access the rows in the index's order. This type of scan is called an index sequential scan, or index scan for short. In general, a database system's optimizer has to choose the best scan among table scans and various index scans. Hence, the optimizer needs to be aware of factors that affect the number of page transfers required.

The prior art teaches that the number of page transfers for an index scan depends not only on the number of data pages but also on the organization of the index. For example, the prior art teaches that an index scan through a perfectly clustered index (also referred to as a clustered index scan) is often preferable to a table scan. An index is perfectly clustered if, in an index scan, each data page is accessed only once. For this to occur, the data rows, when accessed in index order, must be in the same sequence as the sequence in which they are stored in the data pages of physical storage. An index scan through a clustered index is fast because the number of data page accesses is minimized since duplicate accesses to the same data page are unnecessary.

The prior art also teaches that an index scan through a non-clustered index (also referred to as a non-clustered index scan) is often undesirable. An index is non-clustered if, in an index scan, the data pages are accessed back and forth at random. Index scans through non-clustered indexes are extremely slow, because there is much thrashing back and forth between data pages as the index requires separate data pages to be randomly accessed and transferred into and out of the processing unit's main memory but accesses only one row from the many on each such page.

U.S. Pat. No. 5,043,872, which issued Aug. 27, 1991 to International Business Machines Corporation, discloses a method for measuring the degree of clustering of an index as a single value known as a clustering coefficient. This clustering coefficient can be used by a database system's optimizer to estimate the number of page transfers for an index scan.

U.S. Pat. No. 5,778,353, which issued Jul. 7, 1998 also to International Business Machines Corporation, discloses that the number of page transfers for an index scan depends not only on the organization of the index but also on the configuration of the database system. In particular, the number of transfers depends on the amount of the processing unit's main memory that is dedicated to caching data pages from a table. This memory cache is usually referred to as a buffer pool. The invention disclosed in U.S. Pat. No. 5,778,353 models the relationship between the size of the buffer pool and the number of transfers required for a scan of any selected index. This relationship is sometimes called Full index scan Page Fetch or FPF information.

In a traditional database management system, the database administrator or user can issue a request to collect statistics so that the system's optimizer has up-to-date information on tables and indexes. For example, DB2 Universal Database provides a command called "runstats" that allows users to collect indexes' clustering coefficients, among other statistics. DB2's runstats command also gives users the option of collecting FPF (i.e. Full index scan Page Fetch) information. Prior versions of DB2 (i.e. versions 6.1 and older) compute the FPF information by simulating a set of buffer pools while scanning an index. For each index entry, each simulated buffer pool is examined to determine if the index entry requires a data page transfer. The FPF information thus gathered is accurate, but the process of computation is extremely time-consuming. In contrast, the process of computing the clustering coefficient is very efficient, but can often yield poor estimates of the number of page transfers.

Accordingly, there remains a need for a mechanism for analyzing data retrieval requirements in a database management system.

SUMMARY OF THE INVENTION

The present invention provides mechanism for estimating the number of page transfers required to scan any selected index for any given buffer pool size. A typical use of this invention is in the statistics collection facility of a database management system.

Advantageously, the mechanism according to the present invention provides substantial increases in performance over the Full index scan Page Fetch (FPF) information collection method used in prior versions of DB2 Universal Database, i.e. versions 6.1 and older. Also, because the mechanism accounts for the buffer pool size, it is capable of much more accurate estimation than prior methods that fail to use information about the buffer pool.

The method according to the subject invention comprises two principal steps. In the first step, the index is read and a sampling technique is optionally applied. For each data page in a selected sample set, information is recorded regarding the distribution of index entries that refer to the data page. In the second step, the buffer pool size and the information collected in the first step are used to generate an estimate of the number of page transfers.

In a first aspect, the present invention provides a method for analyzing data retrieval using index scanning in a database management system, the database management system including a processing unit and physical storage for storing data, the physical storage being operably connected to the processing unit, the physical storage containing at least one database table stored in a plurality of pages, each database table having a plurality of rows of data, and one or more indexes composed of a sequence of entries referencing the rows, and the processing unit having a memory and a portion of the memory comprising a buffer pool for caching data pages from the database table, the method comprises the steps of: (a) scanning one of the indexes associated with the database table of interest and selecting pages in the index; (b) extracting index entries for each of the selected pages; (c) ranking the index entries; (d) determining a distance parameter for each of the ranked index entries, wherein the distance parameter is derived from the relationship between the index and an index of lesser rank; (e) determining the number of consecutive index entries that can be stored in the buffer pool; and (f) estimating the number of page transfers based on the distance parameters and the number of consecutive index entries.

In a second aspect, the present invention provides a computer program product for use on a computer for analyzing data retrieval using index scanning in a database management system, the database management system including a processing unit and physical storage for storing data, the physical storage being operably connected to the processing unit, the physical storage containing at least one database table stored in a plurality of pages, each database table having a plurality of rows of data, and one or more indexes composed of a sequence of entries referencing the rows, and the processing unit having a memory and a portion of the memory comprising a buffer pool for caching data pages from the database table, the computer program product comprises: a recording medium; means recorded on the medium for instructing the computer to perform the steps of, (a) scanning one of the indexes associated with the database table of interest and selecting pages in the index; (b) extracting index entries for each of the selected pages; (c) ranking the index entries; (d) determining a distance parameter for each of the ranked index entries, wherein the distance parameter is derived from the relationship between the index and an index of lesser rank; (e) determining the number of consecutive index entries that can be stored in the buffer pool; and (f) estimating the number of page transfers based on the distance parameters and the number of consecutive index entries.

In another aspect, the present invention provides a relational database management system for use with a computer system wherein queries are entered by a user for retrieving data from tables, the relational database management system includes a processing unit and physical storage for storing data, the physical storage being operably connected to the processing unit, the physical storage contains at least one database table stored in a plurality of pages, each database table has a plurality of rows of data, and one or more indexes composed of a sequence of entries referencing the rows, and the processing unit includes a memory and a portion of the memory comprising a buffer pool for caching data pages from the database table, the relational database management system comprises: (a) means for scanning the indexes associated with the database table of interest and means for selecting pages in the scanned index; (b) means for extracting index entries for each of the selected pages; (c) means for ranking the index entries; (d) means for determining a distance parameter for each of the ranked index entries, wherein the distance parameter is derived from the relationship between the index and an index entry of lesser rank; (e) means for determining the number of consecutive index entries that can be stored in the buffer pool; and (f) means for estimating the number of page transfers based on the distance parameters and the number of consecutive index entries.

BRIEF DESCRIPTION OF THE DRAWINGS

Reference will now be made to the accompanying drawings which show, by way of example, preferred embodiments of the present invention and in which:

FIG. 3 shows exemplary distance calculations for an index;

DETAILED DESCRIPTION

Figure 1:
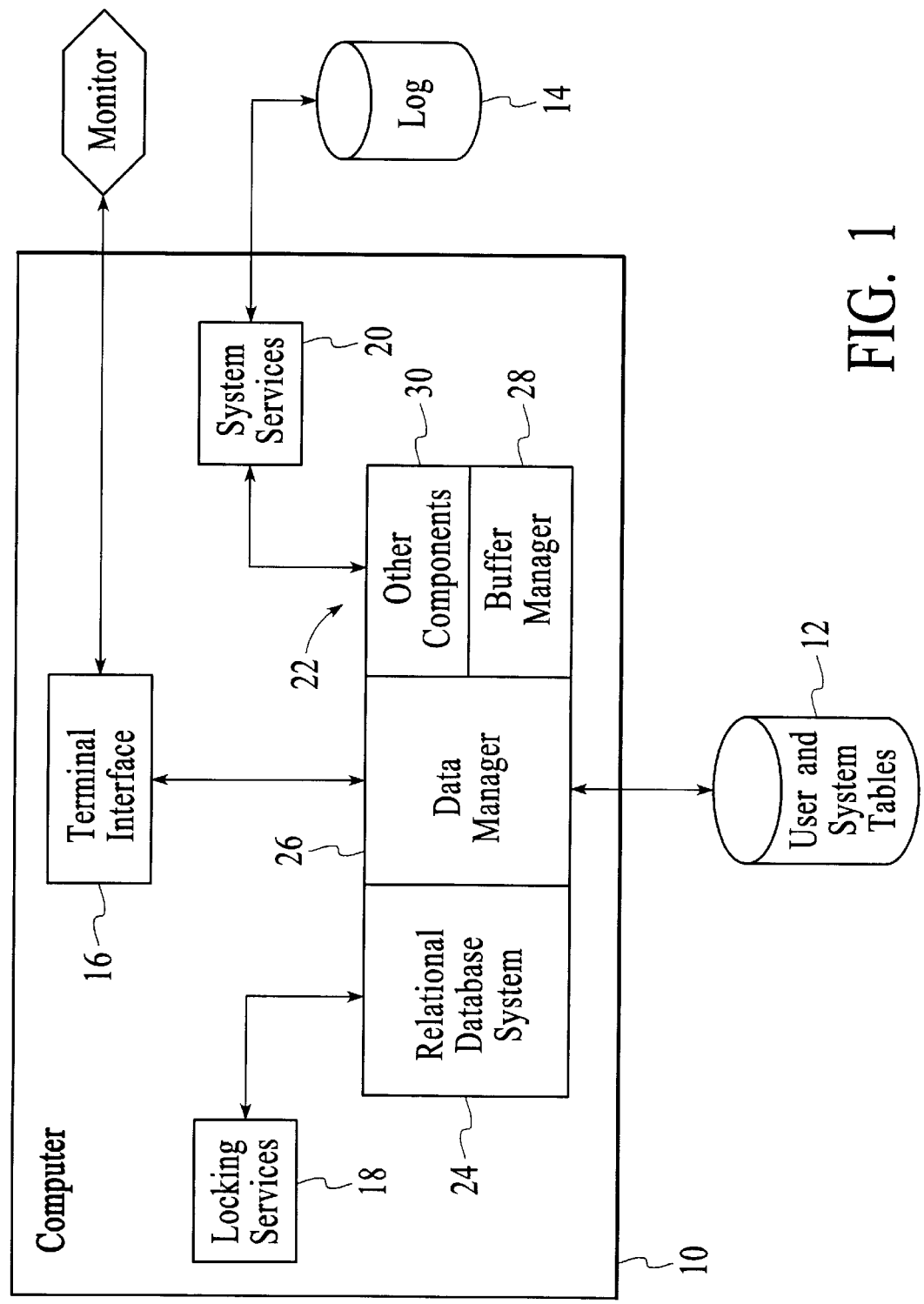
FIG. 1 shows in diagrammatic form a computer system for the present invention.

Reference is first made to FIG. 1 which shows an exemplary computer system 10 which is suitable for use with the present invention. As shown in FIG. 1, the computer system 10 comprises one or more processors connected to one or more electronic storage devices 12 and 14, such as disk drives, that store one or more relational databases. Users of the computer system 10 use a standard operator interface 16, such as OS/2 or other similar interface, to input commands for performing various search and retrieval functions, termed queries, against the databases. In the context of the present invention, these queries conform to the Structured Query Language (SQL) standard, and invoke functions performed by a Relational Database Management System (RDBMS). In the preferred embodiment of the present invention, the RDBMS software comprises the DB2 product offered by IBM for the MVS or OS/2 operating systems. Those skilled in the art will however recognize that the present invention has application to any RDBMS program that utilizes SQL.

As shown in FIG. 1, the DB2 architecture for the MVS operating system includes three major components: an IMS Resource Lock Manager (IRLM) 18, a System Services module 20, and a Database Services module 22. The IRLM 18 handles locking services because DB2 treats data as a shared resource, thereby allowing any number of users to access the same data simultaneously. As a consequence, concurrency control is required to isolate users and to maintain data integrity. The System Services module 20 controls the overall DB2 program execution environment, which includes managing log data sets 14, gathering statistics, handling startup and shutdown, and providing management support.

At the center of the DB2 architecture is the Database Services module 22. The Database Services module 22 contains several sub-modules, including the Relational Database System (RDS) 24, the Data Manager 26, and other components such as a SQL compiler. As will be understood by those skilled in the art, these sub-modules support the functions of the SQL language, i.e. definition, access control, retrieval, and update of user and system data.

The DB2 architecture like most RDBMS maintains indexes for the tables. The index comprises a list and is stored separately from the rows and used to access the rows in a selected order. An index comprises many index entries; each index entry includes a key value and an identifier of or pointer to a row, which contains that key value. Indexes are physically stored on index pages. To scan a table's rows using an index, the index entries are read sequentially and pointers in the entries are used to access the rows in the index's order.

Figure 2:
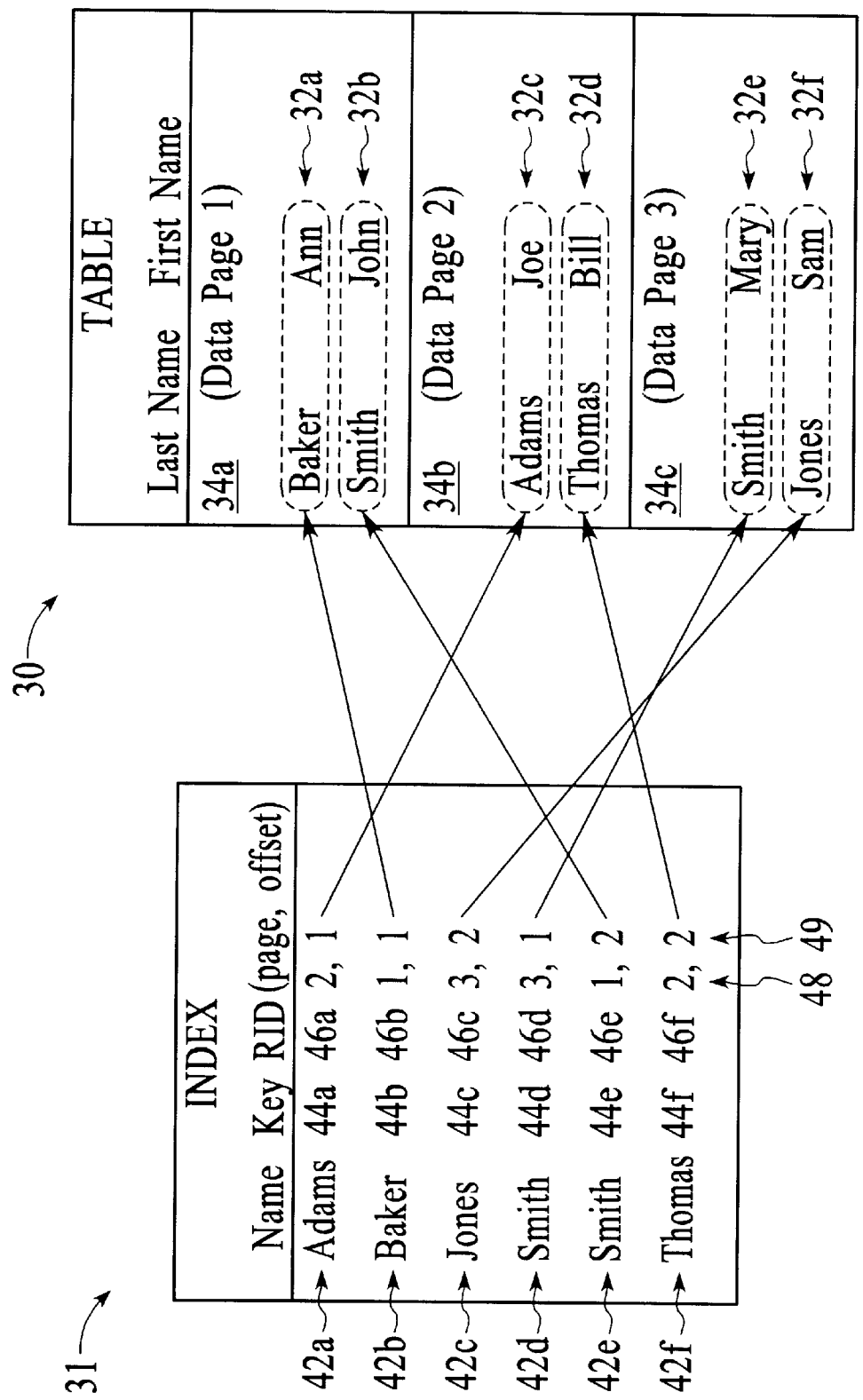
FIG. 2 shows a table and an index for the relational database management system of FIG. 1.

Reference is made to FIG. 2, which shows an exemplary database table 30 and an exemplary database index 31 in the context of the present invention. The database table 30 comprises six rows 32 of data, each row 32 is shown individually as 32a, 32b, 32c, 32d, 32e and 32f. The rows 32 are stored over three pages 34, indicated individually as 34a, 34b and 34c in FIG. 2.

The index 31 comprises an ordered list of entries 42, indicated individually as 42a, 42b, 42c, 42d, 42e and 42f. Each index entry 42 includes an index key value 44 (shown individually as 44a, 44b, 44c, 44d, 44e, and 44f) and a row identifier or RID 46 (shown individually as 46a, 46b, 46c, 46d, 46e and 46f). Each RID 46 comprises a disk address or page number of a table row 48 and an offset 49.

As shown in FIG. 2, the entries 42 in the index 31 are listed in increasing (ascending) alphabetical order by last name. Since the indexes 31 are ordered, it is convenient to consecutively number the index entries 42. It will be appreciated that the numbers for the index entries 42 are not physically stored in the index 31, but are assigned when the entire index 31 is scanned. These numbers for the index entries 42 will be referred to as ranks. For example, the second index entry 42b in the index 31 has a rank 2.

In the computer system 10 for the relational database management system (RDBMS), only a limited amount of the main memory for the processor unit is available for caching data pages. This memory cache is usually referred to as a buffer pool. If a table (e.g. the table 30 in FIG. 2) has more data pages 34 than can fit in the memory, i.e. the buffer pool, then during an index scan, some data pages may have to be discarded from the buffer pool to provide room for other pages. A known method for choosing pages to discard is the "Least Recently Used" or LRU algorithm. Whenever a page must be discarded, the LRU algorithm selects the page that was accessed least recently among all buffer pool pages.

The mechanism according to the present invention utilizes distances for the entries 42 in the index 31. The distance associated with a given index entry is defined as:

(1) the difference in rank between the given index entry and the index entry previous to the given index entry that refers to the same data page, or (2) infinity, if there does not exist any index entry previous to the given index entry that refers to the same page as the given index entry.

Reference is next made to FIG. 3, which shows the index denoted by a primed reference 32' with distances 52 for each index entry of an index 31'. FIG. 3 also shows the ranks 50 for the index 31'. It is to be understood that the distance 52 for any index entry 42 must be at least 1. An index entry 42 with low distance (e.g. the index entry 42d) as compared to an index entry 42 with a high distance (e.g. the index entry 42g) is less likely to require a page transfer since the data page referenced by the index entry 42d is more likely to stay in the buffer pool (i.e. main memory for the processor unit). An index entry 42 with infinite distance, e.g. index entries 42a to 42c or 42e, always requires a page transfer.

Reference is next made to the pseudocode listings below, which illustrate a specific embodiment of a method according to the present invention. The method according to the invention comprises two principal processing operations or procedures 100 and 200. The first processing operation 100 involves obtaining up-to-date information to determine index entry distances 52 for the index 31' (FIG. 3). This operation is typically part of the statistics collection routines in the RDBMS. The index entry distances 52 are then used by the second processing module 200. The second processing operation 200 comprises two sub-operations 200a and 200b. The first sub-operation 200a involves further computation of the distance information, and is called either in the statistics collection routines or in the RDBMS's optimizer while the optimizer is generating an access plan for a user request. The second sub-operation 200b estimates the number of page transfers, and is called either in the statistics collection routines or in the optimizer.

| First Processing Operation 100 | |
|---|---|
| 111 | Initialize array C of counts to 0 |
| 112 | For each index page Ip |
| 113 | Read index page Ip |
| 114 | For each index entry Ie in Ip |
| 115 | Obtain index entry Ie |
| 116 | Extract page number P from Ie |
| 117 | If P satisfies the sampling criterion, then |
| 118 | If P is already in the sample, then |
| 118.1 | Compute distance d of Ie |
| 118.2 | Increment $C_d$ by r |
| 119 | Else |
| 119.1 | Add P to the sample |
| 119.2 | Increment $C_0$ by r |

| | -continued |
|---|---|
| 120 | End if |
| 121 | End if |
| 122 | End loop |
| 123 | End loop |

| Second Processing Operation 200 | |
|---|---|
| First Sub-Operation 200a | |
| 211 | For all I between 1 and N (inclusive) |
| 212 | Compute $p_I$, the proportion of index entries with distance no less than I |
| 213 | End loop |
| Second Sub-Operation 200b | |
| 221 | Initialize D, L to 0 |
| 222 | Repeat loop |
| 223 | Set L = L + 1, D = D + $p_L$ |
| 224 | Until D>=B |
| 225 | Return $N*p_{L+1}$, which is an estimate of the number of page transfers |

Referring to the pseudocode, the first processing operation 100 includes the following processing steps. The first step at Line 111 involves initializing an array C of counters to 0. The array C is used to store distances 52 (FIG. 3) of the entries 42 in the index 31', such that $C_i$ is a count of the number of index entries 42 associated with distance i. In the pseudocode the parameter $C_0$ represents the number of index entries 42 associated with infinite distance, since in actuality no index entry 42 will have a distance of zero. The next operation at Lines 112–116 involves performing a full scan of the index 31' to obtain the numbers of the data pages 34 stored in the index 31'. The next step at Line 117 involves applying a sampling criterion to each page number P. Any page number that fails to satisfy the sampling criterion is skipped. A sampling parameter r is chosen with the objective of processing only 1 out of r data pages. The sampling parameter r may be chosen by the user or by the RDBMS. The sampling criterion is typically quite simple, for example only page numbers divisible by r are selected.

For a page number P that satisfies the sampling criterion, the next step at Line 118 involves testing if the page has been encountered previously in the index. If yes, then the next step at Lines 118.1–118.2 involves calculating the distance d of the corresponding index entry and updating the array C of counts. The distance is easily calculated if the rank of the previous index entry referring to page P is recorded during the index scan. If the page P has not been previously encountered, the page P is recorded and the array of C of counts is updated at Lines 119–119.2. To account for the effect of sampling, the count is incremented by r.

Referring again to the pseudocode, the second processing procedure or operation 200 comprises the first 200a and the second 200b processing sub-operations. The first processing sub-operation 200a at Lines 211–213 involves computing the proportion $p_I$ of index entries 42 with a distance 48 no less than I, or, in other words, the sum of all counts of distances no less than I, divided by the total sum of all counts of all distances. This operation requires an estimate of the number N of index entries 42, which may be computed by the statistics collection routines in the RDBMS or optionally during the first processing operation 100, and the size B of the buffer pool, measured in pages.

The second processing sub-operation 200b involves estimating the number of page transfers to the buffer pool (i.e. main processor memory). Starting at Line 221, variables D and L are initialized to zero. The variable D provides an estimate of the average number of distinct page numbers in a group of L consecutive index entries. The next step at Lines 222–224 involves applying a formulae to increase D and L until D is no less than B, where B is the size of the buffer pool (i.e. memory available for page transfers). After this operation, the variable L provides an estimate of the average number of consecutive index entries that are required to fill the buffer pool of size B. It is assumed that index entries associated with distances greater than L require page transfers, and the value returned at Line 225 is $N*p_{L+1}$. Since N is the number of index entries, and $p_{L+1}$ is the proportion of index entries with distance greater than L, the product $N*p_{L+1}$ is the number of index entries with distance greater than L, and the number given by $N*P_{L+1}$ provides an estimate of the number of page transfers.

Figure 4:
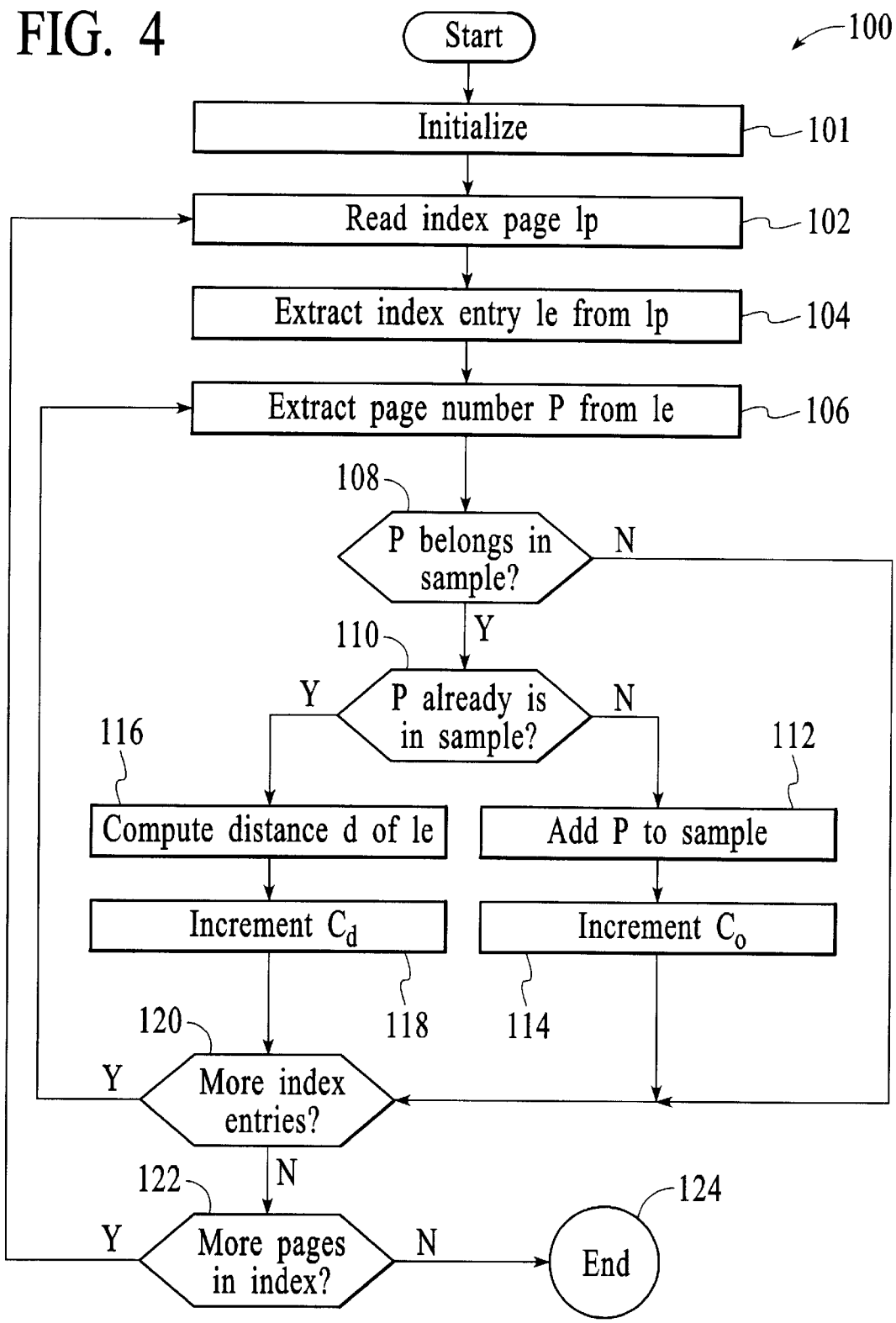
FIG. 4 shows in flow chart form the first part of a method according to the present invention.
Figure 5:
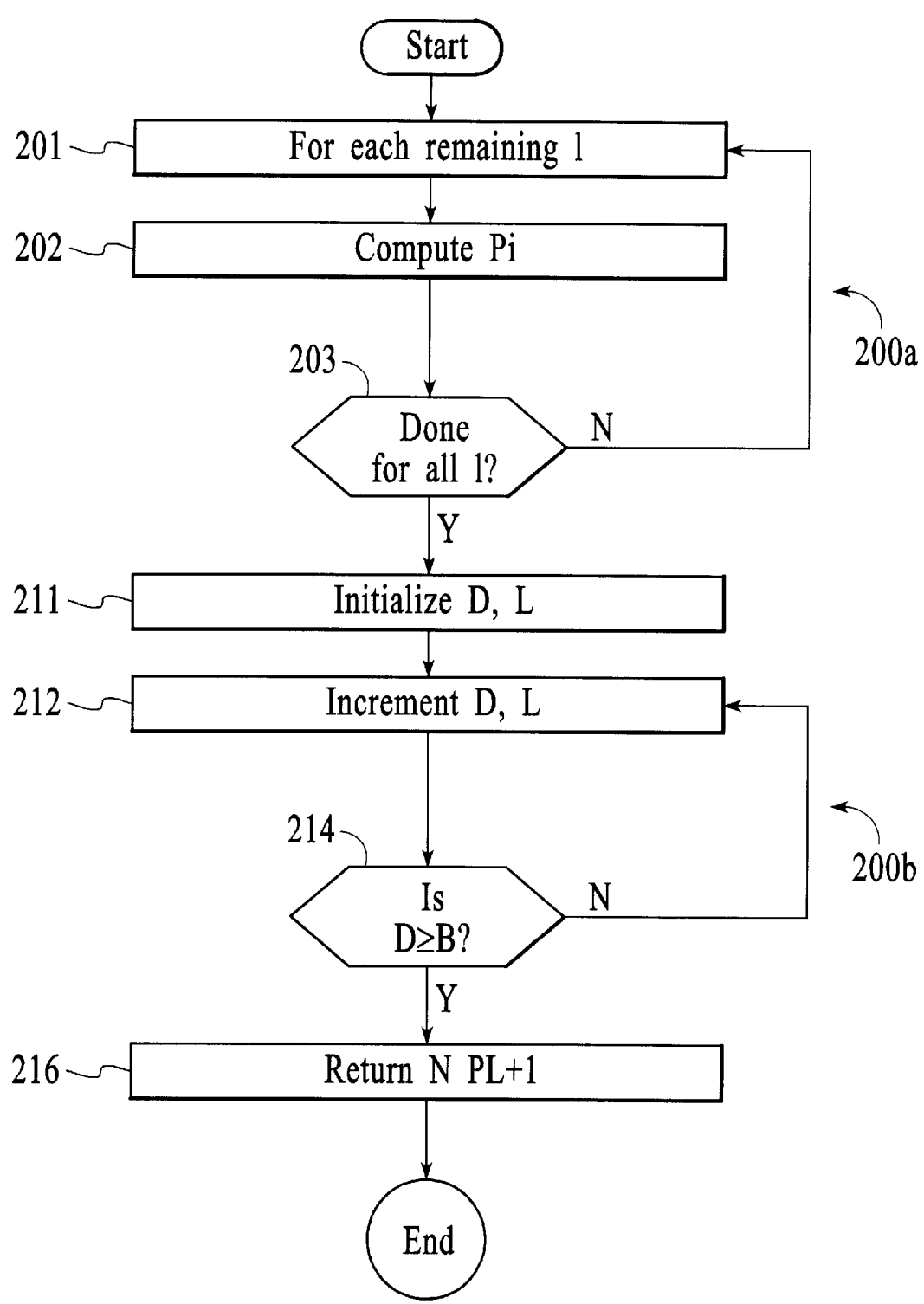
FIG. 5 shows in flow chart form the second part of the method according to the present invention.

Reference is next made to FIGS. 4 and 5, which show the embodiment of the method according to the present invention in flowchart form. FIG. 4 shows the steps for the method in the first processing operation 100, and FIG. 5 shows the steps for the method in the second processing operation 200.

As shown in FIG. 4, the first step in the first processing operation 100 involves an initialization operation 101 in which the counter array C is set to zero or cleared. The next sequence of steps starting at block 102 involves performing a full scan of the index to extract the numbers of the data pages stored in the index. The operation in block 102 involves reading the index page Ip and extracting the index entry Ie (shown as 46 in FIG. 2) in block 104. The next step in block 106 comprises extracting the page number P from the index entry Ie obtained in step 104.

Referring still to FIG. 4, the next sequence of steps involves determining whether the page P extracted in block 106 belongs in the sample and computing the distance of the index entry. In decision block 108, a check is made to determine if the page P belongs in the sample. If yes, then a check is made in decision block 110 to determine if the page P has already been included in the sample. If not, the page P is placed in the sample (block 112) and the counter $C_0$ is incremented (block 114). If the page P is already in the sample, then the distance d of the index entry $I_e$ is computed in block 116, and the counter $C_d$ is incremented in block 118. Next a check is made in decision block 120 to determine if there are any more index entries for the page P in the index. If there are more index entries, then the index entry Ie is extracted from the index page Ip (as described above for block 104). If there are no more index entries in the index page, then a check is made in decision block 122 to determine if there any more pages in the index. If there are no more pages in the index, then the processing in the first processing operation 100 is completed (block 124).

Referring again to FIG. 4, if the page P does not belong in the sample as determined in decision block 108, then a check is made in decision block 120 to determine if there any more index entries $I_e$ for the page. If there are no more index entries $I_e$, then a check is made in decision block 122 to determine if there any more pages in the index, and if there are no more pages, then the processing in the first processing operation 100 is again completed in block 124.

Referring next to FIG. 5, the method for the second processing operation 200 comprises the first sub-operation 200a and the second sub-operation 200b. As shown in FIG. 5, the first sub-operation 200a involves computing the proportion of index entries $P_I$ having a distance no less than I. This operation is implemented as a loop in blocks 201, 202 and 204. Once all the proportions have been computed for all the index entries I (decision block 203), the second sub-operation 200b is performed starting at block 211. The first step in block 211 involves initializing the variable D and the variable L. The variable D is an estimate of the average number of distinct page numbers in a group of L consecutive index entries. Next in block 212, the variables D and L are incremented until the variable D is greater than or equal to the buffer pool size B as determined in decision block 214. In this sense, the variable L becomes an estimate of the number of consecutive index entries that are required to fill the buffer pool (i.e. cache in main memory) having size B. After the number of consecutive index entries to fill the buffer pool is determined (block 214), an estimate of page transfers $N*P_{L+1}$ is returned in block 216. The number of page transfers $N*P_{L+1}$ is determined by considering that index entries having a distance greater than L will result in a page transfer.

The present invention is particularly suitable for use in conjunction with the system disclosed in U.S. Pat. No. 5,778,353 for collecting approximate "Full scan Page Fetch" (FPF) information.

It will be appreciated that, although specific implementation of this invention has been described above for purposes of illustration, many modifications and extensions may be made without departing from the spirit and scope of the invention. For example, multiple indexes may be scanned and processed. Also, rather than storing exact counts of distances as in the processing operation 100, a histogram may be used to maintain counts of ranges of distances instead of counts of individual distances. Furthermore, multiple histograms may be used to store distance information for different subsets of index entries which may or may not overlap. The values of $P_I$ in the first sub-operation 200a in the second processing module 200 may be calculated for only a small subset of values of I, and the missing values of $P_I$ can be interpolated as necessary in the second sub-operation 200b. Moreover, the formulae to increase L and D in the second sub-operation 200b may be replaced by other formulae that utilize additional information.

It will also be understood that this invention is not limited to relational database queries, but can be applied to optimizing the access paths in joining relational database tables. Further, the invention is considered to have value outside the field of relational database management systems, in the broader realm of estimating page accesses in other data processing applications. It will be understood that outside the area of relational databases, there is data commonly considered to be stored in "records" and other structures (analogous to the indexes described above) are used to access the records in sequences other than that in which they were stored.

Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for data retrieval using index scanning in a database management system, the database management system including a processing unit operably coupled to physical storage for storing data, the physical storage containing at least one database table stored in a plurality of pages, each database table having a plurality of rows, and one or more indexes composed of a sequence of entries referencing the rows, and the processing unit having a buffer pool for caching data pages from the database table, said method comprising the steps of:

(a) ranking selected entries of an index;

(b) determining a distance parameter for each of said ranked index entries, wherein said distance parameter is derived from the relationship between said index and an index of lesser rank;

(c) determining the number of consecutive index entries that can be stored in the buffer pool; and (d) estimating the number of page transfers based on the distance parameters and the number of consecutive index entries.

2. The method as claimed in claim 1, further including after said step (a) the steps of selecting pages for the database table according to a sampling criterion and storing respective page numbers for said selected pages, and wherein said step (b) comprises determining distance parameters for ranked index entries associated with said page numbers.

3. The method as claimed in claim 1, wherein said step (d) comprises estimating the number of page transfers based on the distance parameters exceeding the number of consecutive index entries determined in step (c).

4. The method as claimed in claim 1, wherein said distance parameters comprise counts of distance ranges for the index entries.

5. The method as claimed in claim 1, wherein said step (b) comprises determining distance parameters for one or more subsets of said index entries.

6. A computer program product for use on a computer for data retrieval using index scanning in a database management system, the database management system including a processing unit operably coupled to physical storage for storing data, the physical storage containing at least one database table stored in a plurality of pages, each database table having a plurality of rows, and one or more indexes composed of a sequence of entries referencing the rows, and the processing unit having a buffer pool for caching data pages from the database table, said computer program product comprising:

a recording medium;

means recorded on said medium for instructing said computer to perform the steps of, (a) ranking selected entries of an index;

(b) determining a distance parameter for each of said ranked index entries, wherein said distance parameter is derived from the relationship between said index and an index of lesser rank;

(c) determining the number of consecutive index entries that can be stored in the buffer pool; and (d) estimating the number of page transfers based on the distance parameters and the number of consecutive index entries.

7. The computer program product as claimed in claim 6, further including after said step (a) the steps of selecting pages for the database table according to a sampling criterion and storing respective page numbers for said selected pages, and wherein said step (b) comprises determining distance parameters for ranked index entries associated with said page numbers.

8. The computer program product as claimed in claim 6, wherein said step (d) comprises estimating the number of page transfers based on the distance parameters exceeding the number of consecutive index entries determined in step (c).

9. The computer program product as claimed in claim 6, wherein said distance parameters comprise counts of distance ranges for the index entries.

10. The computer program product as claimed in claim 6, wherein said step (b) comprises determining distance parameters for one or more subsets of said index entries.

11. A computer program product for use on a computer for data retrieval using index scanning in a database management system, the database management system including a processing unit operably coupled to physical storage for storing data, the physical storage containing at least one database table stored in a plurality of pages, each database table having a plurality of rows, and one or more indexes composed of a sequence of entries referencing the rows, and the processing unit having a buffer pool for caching data pages from the database table, said computer program product comprising:

a recording medium;

means recorded on said medium for instructing said computer to perform the steps of, (a) ranking selected entries of an index;

(b) selecting pages for the database table according to a sampling criterion and storing respective page numbers for said selected pages;

(c) determining a distance parameter for each of said ranked index entries associated with said page numbers, wherein said distance parameter is derived from the relationship between said index and an index entry of lesser rank;

(d) determining the number of consecutive index entries that can be stored in the buffer pool;

(e) estimating the number of page transfers based on the distance parameters and the number of consecutive index entries.

12. The computer program product as claimed in claim 11, wherein said step (e) comprises estimating the number of page transfers based on the distance parameters exceeding the number of consecutive index entries determined in step (d).

13. A relational database management system for use with a computer system wherein queries are entered by a user for retrieving data from tables, the relational database management system including a processing unit operably coupled to physical storage for storing data, the physical storage containing at least one database table stored in a plurality of pages, each database table having a plurality of rows, and one or more indexes composed of a sequence of entries referencing the rows, and the processing unit a buffer pool for caching data pages from the database table, said relational database management system comprising:

(a) means for ranking selected entries of an index;

(b) means for determining a distance parameter for each of said ranked index entries, wherein said distance parameter is derived from the relationship between said index and an index entry of lesser rank;

(c) means for determining the number of consecutive index entries that can be stored in the buffer pool; and (d) means for estimating the number of page transfers based on the distance parameters and the number of consecutive index entries.

14. The relational database management system as claimed in claim 13, wherein said means for ranking selected entries include means for selecting pages according to a predetermined criterion and means for storing page numbers for said selected pages.

15. The relational database management system as claimed in claim 13, wherein said means for estimating comprises means for estimating the number of page transfers based on the distance parameters exceeding the number of consecutive index entries.

16. The relational database management system as claimed in claim 13, wherein said means for determining distance parameters includes means for generating counts of distance ranges for the index entries.

17. The relational database management system as claimed in claim 13, wherein said means for determining distance parameters includes means for generating distance parameters for one or more subsets of said index entries.

18. Data storage media recorded with a computer program which, in combination with a general purpose computer configured for a database management system and equipped to read into memory and execute program data from the data storage media, the program data for:

(a) ranking selected entries of an index;

(b) determining a distance parameter for each of said ranked index entries, wherein said distance parameter is derived from the relationship between said index and an index of lesser rank;

(c) determining the number of consecutive index entries that can be stored in the buffer pool; and (d) estimating the number of page transfers based on the distance parameters and the number of consecutive index entries.

19. The data storage media as claimed in claim 18, further including after said step (a) the steps of selecting pages for the database table according to a sampling criterion and storing respective page numbers for said selected pages, and wherein said step (b) comprises determining distance parameters for ranked index entries associated with said page numbers.

20. The data storage media as claimed in claim 18, wherein said step (d) comprises estimating the number of page transfers based on the distance parameters exceeding the number of consecutive index entries determined in step (c).

21. The data storage-media as claimed in claim 18, wherein said distance parameters comprise counts of distance ranges for the index entries.

22. The data storage media as claimed in claim 18, wherein said step (b) comprises determining distance parameters for one or more subsets of said index entries.

* * * * *